July 5, 1966  D. M. MacMILLIN ETAL  3,259,044
MANUALLY POWERED ZOOMING MECHANISM
Filed Nov. 27, 1963  7 Sheets-Sheet 7

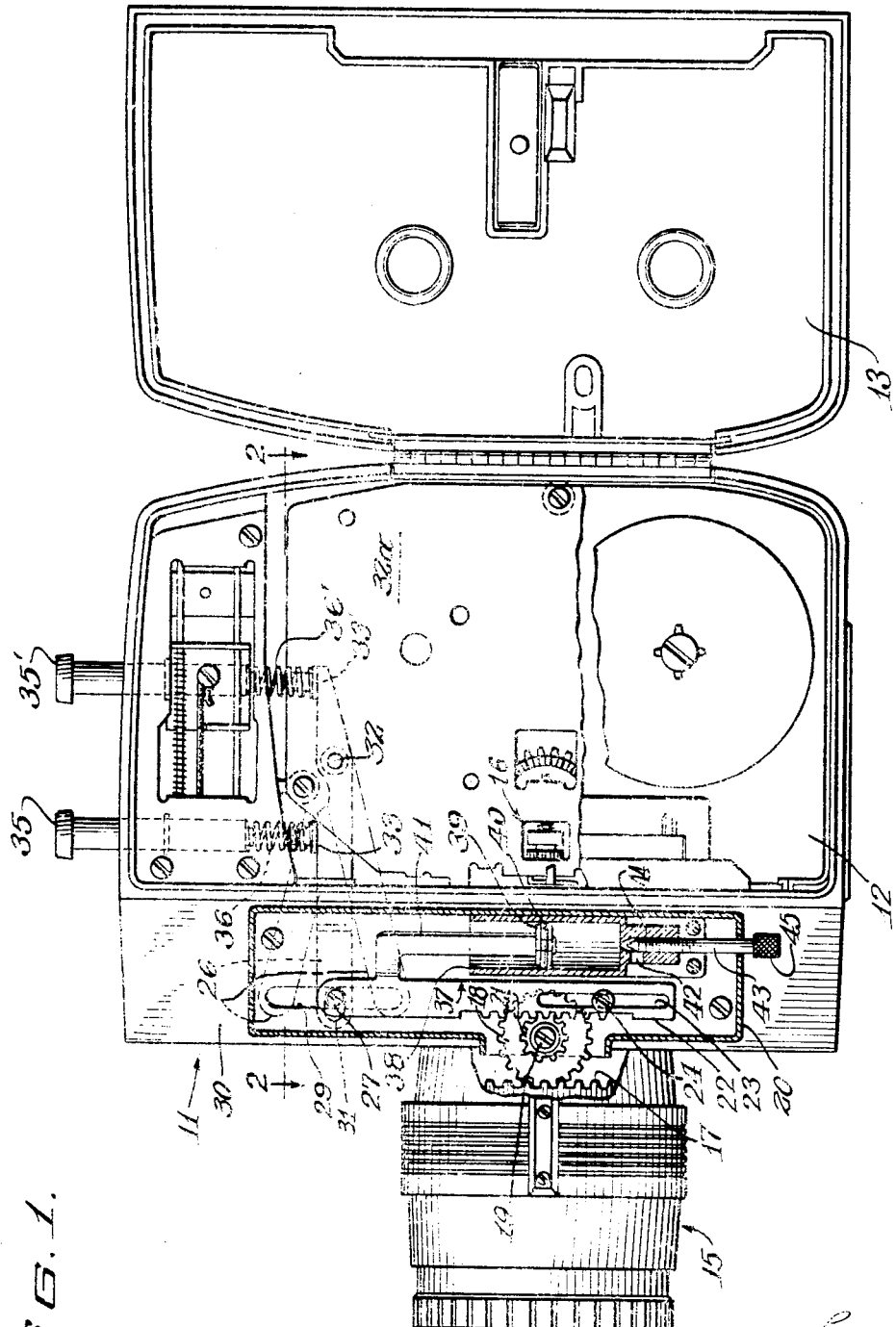

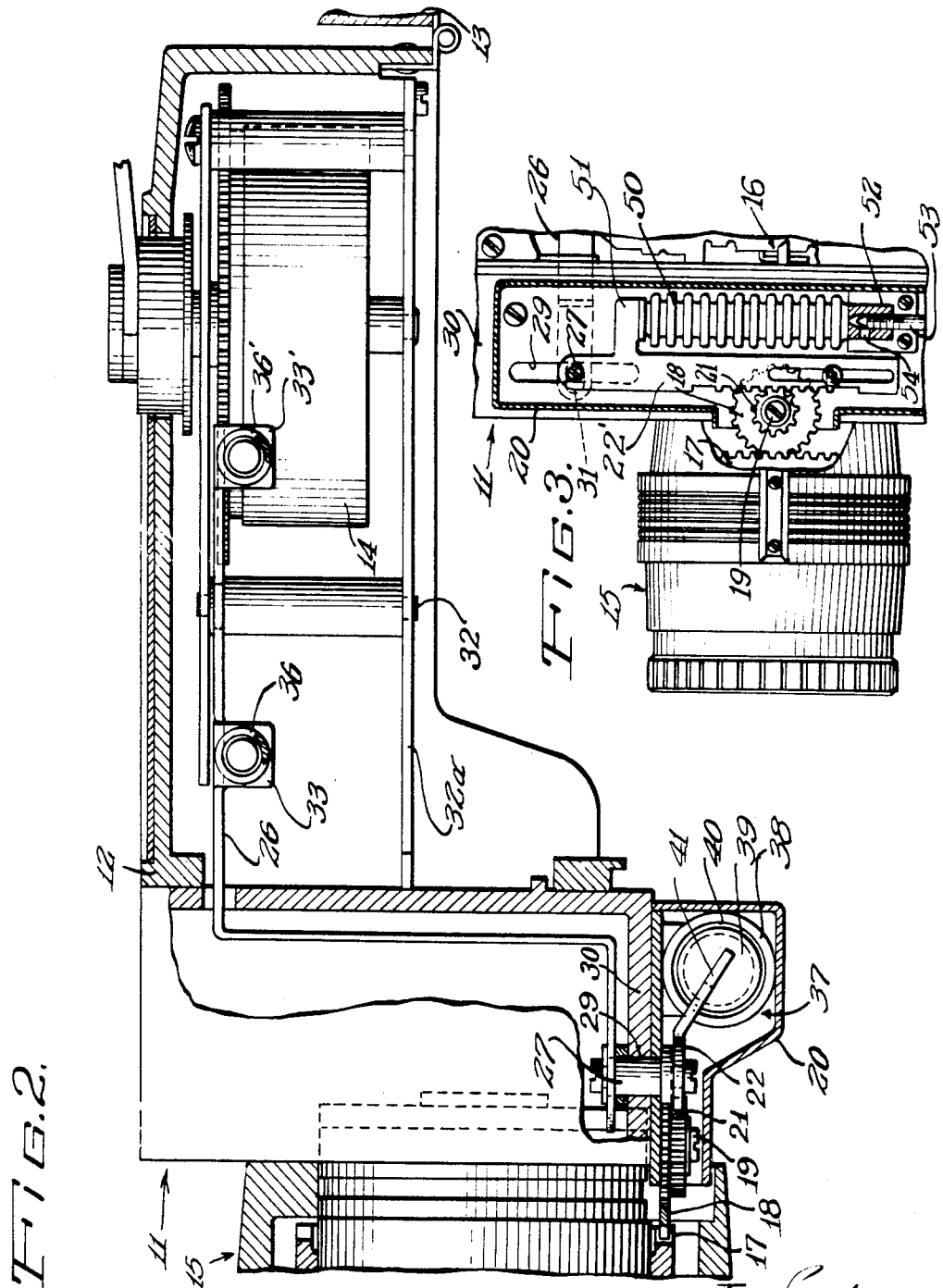

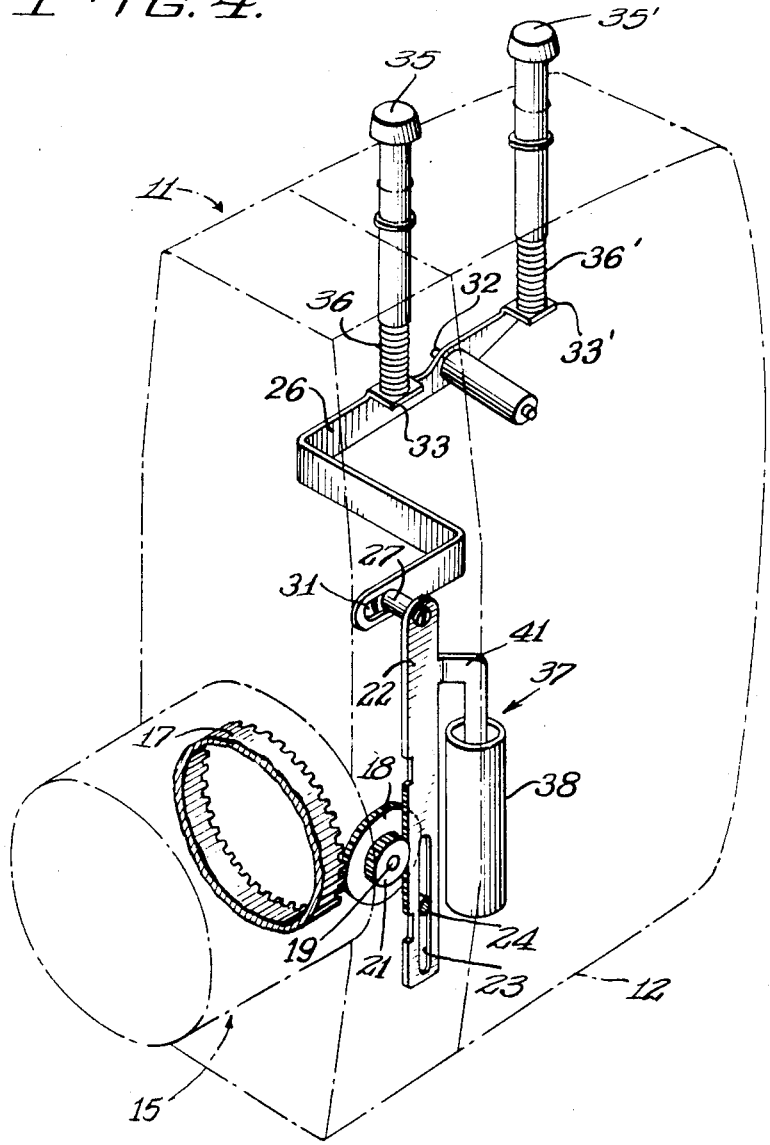

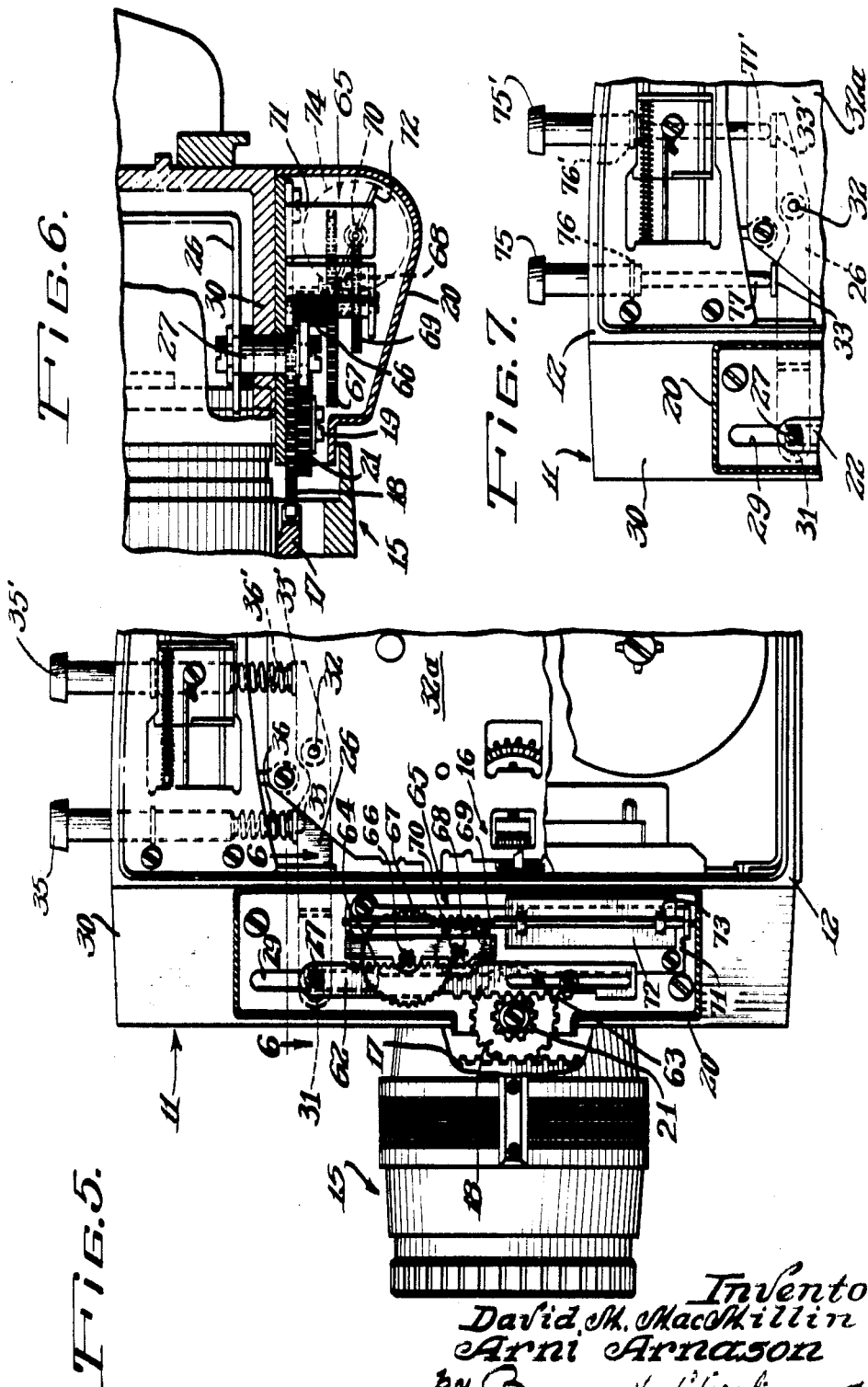

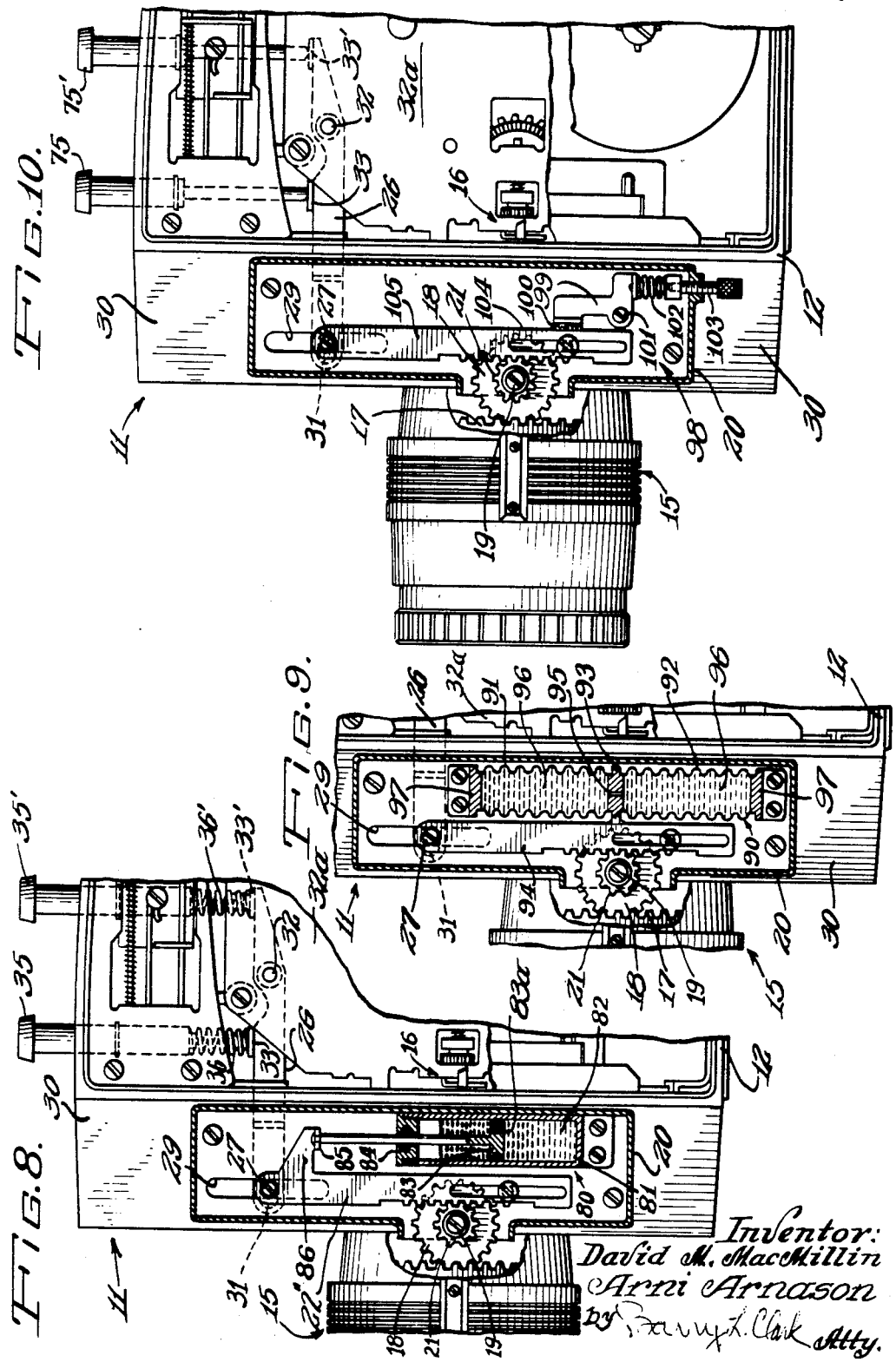

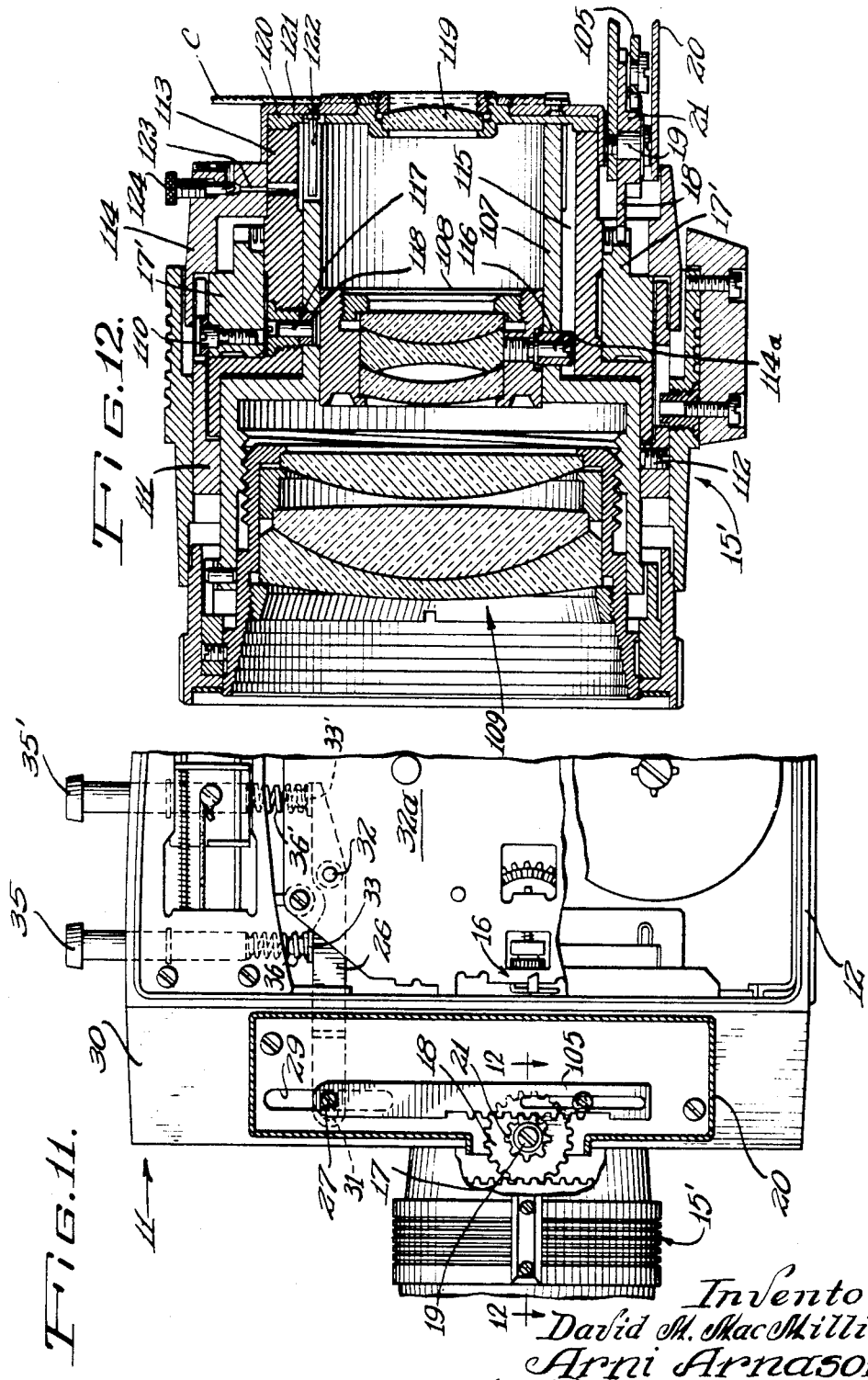

Inventor:
David M. MacMillin
Arni Arnason
by Barry L. Clark Atty.

United States Patent Office 3,259,044
Patented July 5, 1966

3,259,044
MANUALLY POWERED ZOOMING MECHANISM
David M. MacMillin, Wilmette, and Arni Arnason, Northfield, Ill., assignors to Bell & Howell Company, Chicago, Ill., a corporation of Illinois
Filed Nov. 27, 1963, Ser. No. 326,632
15 Claims. (Cl. 95—45)

This invention relates to improvements in motion picture cameras having zoom lenses and more particularly to novel means for controlling zooming movements of the movable optical elements in the zoom lenses.

In motion picture cameras embodying zoom lenses, it is desirable to be able to adjustably vary the focal length and angle of view of magnification of the lens during the continuous filming of a scene. To obtain pleasing jerk-free results in the picture taking, such adjustments must be effected in an extremely smooth manner. This presents a special problem in hand held cameras.

A very steady zoom can be obtained by the use of linkages coupling the lens to the spring wound camera drive motor. However, such motor power zoom linkages have certain inherent disadvantages, one of which is that they take power from the motor and consequently reduce the length of film that can be exposed with each wind-up. Another disadvantage lies in the fact that the camera must be running before the lens can be zoomed. This means that scenes cannot be previewed by zooming from a certain lens position unless means are provided to override or disconnect from the power linkage to enable manual zooming, or unless the film moving mechanism can be disengaged from its drive.

An important object of the present invention is to provide new and improved means for manually adjusting zoom lenses in an extremely smooth and efficient manner throughout the zoom range independently of the film drive and enabling zooming at anytime during preview or actual filming of a scene.

Another object of the invention is to provide new and improved zooming mechanism which is powered manually but wherein the rate of power application to the zoom elements of the lens is controlled.

A further object of this invention is to provide a novel zoom lens actuating mechanism which is manually powered but yet is as steady, smooth, constant in movement and of as even tempo as a motor powered drive.

Still another object of this invention is to provide novel zooming mechanism control means for providing a predetermined rate of lens movement, and which is adjustable to compensate for wear or to attain different desired zooming speeds.

A still further object of the invention is to provide new and improved frictional control means for manually operated zoom lens actuating mechanism.

It is another object of the invention to provide a novel, highly efficient, simple, smoothly controlled manual zoom lens actuating mechanism.

Other objects, features and advantages of the present invention will be readily apparent from the following detailed description of certain preferred embodiments thereof, taken in conjunction with the accompanying drawings, in which:

FIGURE 1 is a side elevational view partially in section and with parts broken away, of a motion picture camera embodying one form of zoom lens actuating device according to the principles of the present invention;

FIGURE 2 is an enlarged horizontal sectional detail view taken substantially along the line 2—2 of FIGURE 1;

FIGURE 3 is a fragmentary side elevational view similar to FIGURE 1 but showing a modification;

FIGURE 4 is a perspective view of the zoom lens actuating mechanism shown in FIGURES 1 and 2;

FIGURE 5 is a partially sectional side elevational view similar to FIGURE 1 but showing a further modification;

FIGURE 6 is a horizontal sectional view taken substantially along the line 6—6 of FIGURE 5;

FIGURE 7 is a fragmentary sectional elevational view showing a modified manual power applying arrangement;

FIGURE 8 is a fragmentary sectional side elevational view depicting still another modification in the motion leveling means of the manual zoom lens drive;

FIGURE 9 depicts yet another modification;

FIGURE 10 is a fragmentary sectional side elevational view showing a still further modification;

FIGURE 11 is a sectional elevational view depicting still another manual zoom lens actuating arrangement;

FIGURE 12 is an enlarged fragmentary horizontal sectional detail view taken substantially on the line 12—12 of FIGURE 11;

Figure 13:
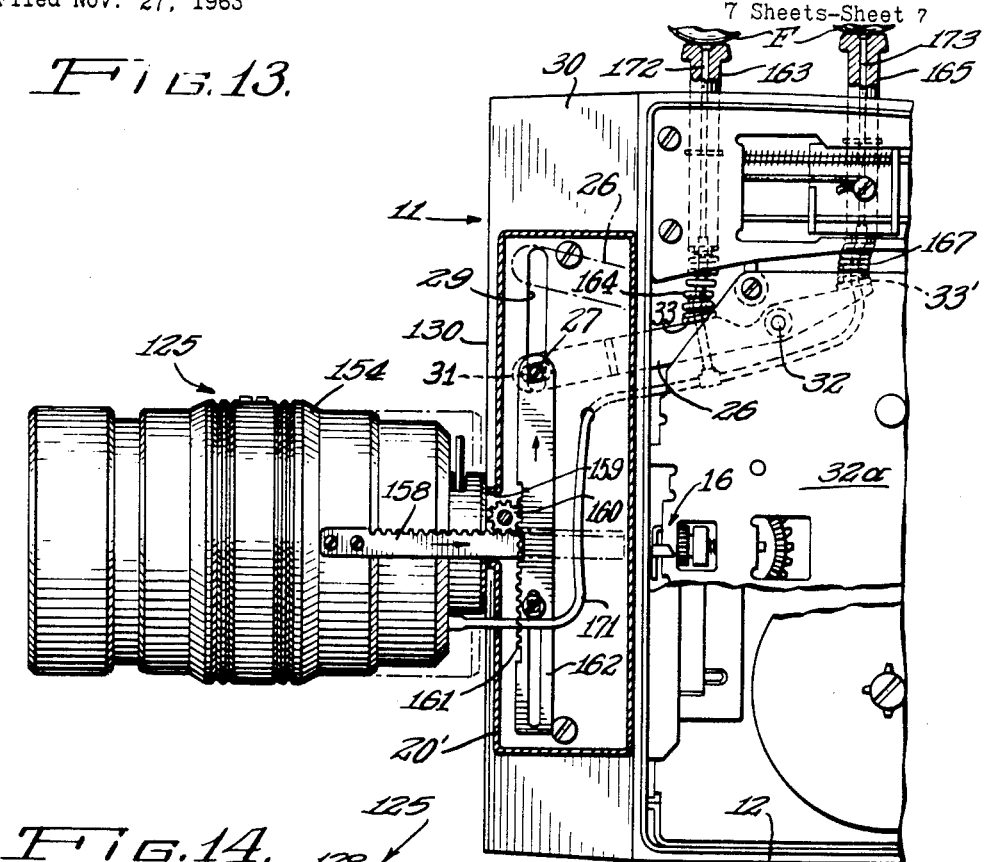
FIGURE 13 is a fragmentary sectional elevational view depicting a further and yet additional arrangement for manual zoom lens actuation under smoothly controlled adjustable movement.

In all forms of the invention disclosed manual, and more particularly finger applied, power is utilized for zooming actuation of the zooming lens of the motion picture camera. Further, in all forms of the invention novel means are provided for overcoming unsteadiness or erratic, jerky transmission of the manual power so that an extremely steady zooming rate is attained. In each instance the manual power is applied through a lever and means are provided in association with the power transmission for attaining a substantially constant, level, steady, smooth, even tempo zooming movement of the zoom lens system. In all instances the movement controlling means comprises a resistance device against which, or to overcome which, the power must operate.

In FIGURES 1, 2 and 4 are shown a typical manually portable motion picture camera 11 including a body casing or housing 12 affording a recess or chamber arranged to be closed by a hinged door 13. Within the housing are the usual or preferred film gate (not shown) and film advancing mechanism 16, film supporting structure, spring motor 14, and the like. Mounted on the front of the housing 12 is a zoom lens structure 15 aligned with the usual fixed objective (not shown) carried by the housing forwardly of the film gate and shutter mechanism. This zoom lens structure may be essentially similar to and function on the order of that described in Patent 3,059,533, dated October 23, 1962, except that in the present instance zooming of the lens is effected through the medium of a crown gear 17 comprising a rotatable part of the zoom lens assembly. Means for rotating the crown gear in either direction for zooming comprises a pinion 18 rotatably mounted on a pivot pin 19 secured in proper location adjacent to the rear end of the supporting barrel for the zoom lens assembly and within a protective, generally capsular, vertically elongated actuating mechanism chamber casing 20 suitably attached to the camera body or housing.

Means for driving the zoom ring gear driving pinion 18 comprise an integral smaller diameter coaxial pinion 21 thereon which is drivingly in mesh with suitable rack teeth on a vertically reciprocable power transmission rack bar 22 having adjacent to its lower end a guide slot 23 through which extends a fixed guide pin 24 carried by the camera body. Adjacent to its upper end the rack bar 22 is connected to the forward end portion of an annular rock lever 26 by means of a pivot pin 27 which extends through a vertical guide slot 29 in a side wall panel 30 of the head end portion of the camera housing. Connection of the pin with the rock lever 26 is through a suitable head end clearance slot 31 to enable power transmission through a substantial arcuate range of rocking movement of the lever 26 about a fixed pivot pin 32 which may be part of or carried by mechanism framework 32a, within the camera housing 12.

Forwardly from the fixed pivot 32, the upper edge of the rock lever 26 is provided with an upwardly facing angular thrust flange 33; and rearwardly from the fixed pivot, the rock lever has a similar upwardly facing angular thrust flange projection 33'.

Manual power applying means accessible externally of the camera housing 12 are provided, herein in the form of a digitally depressible button 35 thrustingly overlying the thrust flange 33 and a similar digitally depressible button 35' operatively overlying the thrust flange 33'. These buttons are suitably freely vertically slidably guided in the top portion of the housing 12 for ready access to two fingers of the camera user's hand to be manipulated on the order of valve buttons of a musical instrument.

In order to attain extremely smooth transmission of manual power from the manipulatable or power buttons 35 and 35' to drive the zoom lens 15, energy storing means are provided herein comprising respective compression springs 36 and 36' between the thrust flanges 33 and 33' and the respective buttons 35 and 35'. Energy stored in either of the springs 36 or 36' by depressing of its associated power button thrusts rockingly against the lever 26 but is released smoothly by the action of a resistance device associated with the transmission rack bar 22 and in the present instance comprising a dashpot 37.

In the present instance, the dashpot 37 comprises an upwardly open hollow cylinder 38 suitably mounted within the casing 20 rearwardly adjacent to the transmission rack bar 23. Reciprocably operable in the cylinder is a piston 39 carrying an O-ring seal 40 and mounted on an arm 41 extending in offset and downward direction from the upper end portion of the rack bar 22. In addition to frictional resistance afforded between the O-ring 40 and the wall of the cylinder 38, controlled resistance to flow of air within the dashpot below the piston 39 is effected through an orifice 42 in the bottom of the cylinder controlled by a needle valve 43 conveniently threaded into a depending boss 44 and having an adjustment knob 45 accessible below the lower end of the casing 20. Through this arrangement, the rate at which zooming actuation of the zoom lens 15 may be effected can be readily controlled by adjustment of the needle valve 43 to determine the rate at which air can be displaced from or drawn into the cylinder 38 by action of the piston 39.

In the arrangement disclosed, the position of the lens actuating mechanism as depicted in full line in FIGURE 1 is the normal or neutral position. When it is desired to zoom the lens to wide angle, the button 35 is depressed to compress its associated spring 36 which thus loads the rock lever 26 in counterclockwise direction so that its end portion connected to the upper end of the rack bar 22 thrusts downwardly. Such downward actuating thrust is resisted by the dashpot 37 and the spring energy released at a controlled rate for smooth downward running action of the rack bar 22 and thus driving of the zoom lens gear train to the limit of stored spring energy or until the limit of wide angle adjustment of the zoom lens has been attained as indicated in the lower dot dash outline position of the lever 26. Zooming to telephoto position is effected by depressing the manual power button 35' to compress and store energy in the spring 36' for thrusting the lever 26 to rock clockwise and actuate the zoom lens through the associated power transmission mechanism at the rate permitted by the dashpot 37. The telephoto limit position of the lever 26 is indicated in the upper dot dash position in FIGURE 1. Of course, any intermediate position between the wide angle and telephoto limit positions is attainable by manipulation of the appropriate manual power button and release of the buttons at the desired position. Friction inherent in the zooming mechanism and the lens will retain the lens in the desired adjusted position until it is desired to effect a readjustment.

In the modification of FIGURE 3, the camera 11 is the same as in FIGURE 1 and operation of the zoom lens 15 is effected in the same manner, except that the resistance device in the manual power transmission for actuating the zoom lens comprises an accordion bellows 50 of substantial length extending vertically rearwardly adjacent to the vertically reciprocable rack bar 22' which has a rearwardly extending arm 51 adjacent its upper end to which the upper end of the bellows is fixedly secured in sealed relation. At its lower end the bellows is fixedly secured to a fixed bracket structure including a boss 52 threadedly carrying an adjustable needle valve 53 for controlling the port or orifice 54 through which air from within the bellows 50 is metered during compression of the bellows in wide angle adjustments of the zoom lens 15 and through which air is metered in returning into the bellows during expansion accompanying telephoto adjustments of the lens. This accordion bellows resistance device for smoothing adjustment movements of the zoom lens has the advantageous characteristic of tending always to return to the normal position by virtue of its inherent spring action. Therefore, when zooming power pressure is released from the manual power buttons and more particularly from the lever 26, the accordion bellows 50 causes the rack bar 22' to return to the normal, neutral position and thus smoothly actuate the zoom lens to its normal or neutral position. In this arrangement, therefore, the power spring load is transferred to the resistance device which due to the spring characteristics of the bellows 50 develops a return spring load due to the energy stored therein by compression during wide angle adjustment of the zoom lens and by tension during telephoto adjustment, acting automatically to restore the system to normal or neutral position or condition when released.

In the embodiment of FIGURES 5 and 6, details of the camera 11 are substantially the same as in FIGURE 1, and in general the manual actuating mechanism for zooming the lens 15 is substantially the same including the manual button, rock lever, rack and pinion and gear structures, but with a modified resistance device for smooth transmission of driving power to the zoom lens. To this end, a transmission rack bar 62 having rack teeth 63 on its forward edge meshing with the pinion 21 is reciprocably guided and pivotally connected to the rock levers 26 similarly as the rack bar 22 in FIGURE 1.

On the upper portion of its rear edge, the power transmission rack bar 62 has a longitudinal set of rack teeth 64 by which it is operatively coupled to a fluctuation eliminating governor assembly 65. This assembly includes a speed increasing gearing including a small diameter pinion 66 meshing with the rack teeth 64 and integral with a larger diameter pinion 67 which in turn meshes with a small diameter pinion 68 integral with a larger, intermediate size pinion 69 meshing with a vertical worm 70 comprising an intermediate part of a vertical shaft of substantial length. Support for the governor gear train and worm shaft is provided by a bracket 71 suitably fastened to the camera body 12 within the housing casing 20. Driving of the worm 70 and thus its elongated shaft causes a vane structure such as an elongated vane 72 fixedly secured as by means of straps 73 to a lower portion of the worm shaft to be whirled by the shaft serving as a spindle for this purpose. In addition to resistance to speed fluctuations afforded by the clockwork-like gear train of the governor 65, air resistance to whirling of the vane 72, as well as centrifugal force serve to prevent uneven, jerky or undesirably fluctuating transmission of the manual power impressed through the zooming buttons 35 and 35' for respectively wide angle and telephoto zooming adjustments. In this form of the invention, similarly as in the form of FIGURE 1, any adjusted position of the zoom lens will be held fairly steadily by the frictional resistance in the governor mechanism 65.

If preferred, instead of a dual blade vane arrangement as provided by the vane 72, additional air vanes may be provided. Further, the vane 72 may be of greater mass than the relatively thin vane form disclosed so as to afford greater centrifugal resistance action. Even more positive, smooth resistance to rotation of the vane 72 can be attained by providing thereabout a chamber 74 (FIG. 6) at least partially filled with a suitable liquid.

Where it is preferred to provide a direct manual thrust to the rock lever 26 instead of a spring load thrust, means may be provided such as depicted in FIGURE 7 comprising manual power wide angle and telephoto zooming finger buttons 75 and 75', respectively. These manipulating or zoom buttons are mounted similarly as the previously described zoom buttons 35 and 35', conveniently vertically reciprocably mounted on the top of the camera housing 12 with the shank portion thereof projecting to a suitable height above the housing and to a suitable length down into the chamber within the housing. Collars or flanges 76 and 76' on the portions of the shanks of the buttons 75 and 75', respectively, within the housing provide suitable stops to prevent unintentional removal or displacement of the buttons. Inward extension portions 77 and 77', respectively on the shanks of the buttons 75 and 75' are constructed and arranged to thrust at their tips against the thrust flanges 33 and 33' respectively of the rock lever 26. Through this arrangement, direct transmission of manual power for zooming actuation of the zoom lens is transmitted from the finger buttons 75 and 75' to the rock lever 26, rather than loading intervening springs as in FIGURES 1 and 5. This direct thrust embodiment is therefore interchangeable with the spring loading arrangement where preferred.

The modification of FIGURE 8 is substantially the same as that shown and described in respect to FIGURE 1 except that the power transmission resistance device for levelling zooming speed comprises a substantially liquid filled dashpot 80 including a cylinder 81 mounted on the camera housing within the enclosure 20 and containing a suitable liquid 82 such as oil of proper low viscosity. Within the vertical barrel of the cylinder 81 a piston 83 is reciprocable and has therethrough a metering orifice 83a affording controlled displacement of the hydraulic fluid 82 from one side to the other side of the piston during its reciprocations. The piston rod extends upwardly through the top closure of the closed dashpot cylinder through a seal 84. At its upper end the piston rod is attached fixedly to a flange 85 on a rearwardly projecting cantilever attachment arm 86 integral with the upper end portion of the power transmission vertically reciprocable rack bar 22''. By virtue of the restricted orifice flow through the piston 83 good control of the zooming rate is attained. Since the liquid 82 is substantially incompressible, there is no tendency for the piston 83 to spring back when push button applied power is released. Also, the seal friction between the dashpot cylinder and piston parts affords, with other frictional resistances in the system excellent retaining means for maintaining the zoom lens adjustment until a resetting or readjustment is effected through action of the zooming buttons 35 or 35'.

In the embodiment of FIGURE 9, another substantially liquid filled resistance device employing metering orifice flow control is depicted including a bellows type regulator or governor 90. The bellows assembly comprises vertically aligned, preferably substantially identical resilient metallic accordion bellows sections 91 and 92 having their adjacent ends secured in sealed relation to a follower disk member 93 rigidly secured to an intermediate portion of the length of the rear edge of a vertically reciprocable power transmission rack bar 94 which is substantially the same as and functions in the power transmission the same as the rack bar 22 of FIGURE 1. A metering orifice 95 through the follower partition disk 93 meters displacement of suitable liquid such as light oil 96 filling the bellows sections 91 and 92. At their ends remote from the partition 93, the bellows sections 91 and 92 are secured in sealed relation to respective brackets 97 fixedly secured to the side of the camera casing. Through this arrangement, zoom lens actuating movements of the rack bar 94 are controlled to a rate of speed limited by metered flow of the liquid 96 through the orifice 95. Thereby a slow, smooth, predetermined zooming rate is attained. Since the resilient accordion bellows sections 91 and 92 tend always to return to a neutral or equal and opposite equilibrium position, automatic return of the zoom lens actuating drive assembly to neutral position occurs at a slow, controlled rate when manual power is released.

In the embodiment of FIGURE 10, a resistance device 98 is provided which affords frictional drag during manual power driving of the zooming mechanism and serves as a brake to retain the mechanism in any desired adjusted relation. To this end, the device 98 includes a frictional block or shoe 100 of any desirable friction material carried by a thrust arm 99 of generally bellcrank form mounted on a pivot 101 on the camera casing and normally biased in a counterclockwise direction as viewed in FIGURE 10 by a compression spring 102 adjustably compressed by means such as an adjustment screw 103 accessible externally of the enclosing casing 20. Mounting of the friction shoe 100 is such that it thrusts against a vertical rear edge surface 104 of a rack bar 105 which is functionally substantially the same as the rack bar 22 of FIGURE 1. In this arrangement, it is desirable to apply manual power directly to the rock lever 26 through the wide angle adjustment and telephoto adjustment finger buttons 75 and 75' of the type described in connection with FIGURE 7. Adjusted thrust of the friction shoe 100 against the power transmission rack bar 105 acts to resist irregularity in manual power application and results in smooth zooming of the lens 15.

In FIGURES 11 and 12, a novel arrangement is depicted wherein the resistance device against which the manual power must operate to assure level zooming adjustment movement of the zooming lens 15' comprises a dashpot device which is coupled to the zooming crown gear 17' of the manual zoom lens actuating mechanism instead of to the reciprocable rack bar 105 in the manual power transmission of the mechanism. In a convenient, simple and efficient arrangement this comprises a dashpot structure within the zoom lens assembly wherein zoom sleeve 107 provides in its rear elongated reduced diameter portion the dashpot cylinder within which relatively rotatably and axially coupled zooming lens unit 108 provides the dashpot piston. In its forward larger diameter portion, the zooming sleeve 107 carries a focusing lens group 109.

In construction and operation, the zoom lens assembly 15' is substantially the same as described in Patent 3,059,533 except that zooming of the lens is effected by rotation of the crown gear 17' instead of through a handle on the lens barrel as shown in the disclosure of the patent. As the crown gear 17' rotates, a splining stud pin 110 rotates a sleeve 111 which by means of set screws 112 or the like is secured fast to the larger diameter portion of the zooming sleeve 107 and thereby effects corotational movement of the zooming sleeve with the crown gear. Such rotation is relative to a fixed barrel or sleeve 113 which carries a rigid base ring 114 and by which the zoom lens may be attached to the front of the camera casing by means of screws or the like (not shown). In response to such relative rotation, a follower and spline pin-roller 114a running in a spline groove 115 holds the zooming lens unit 108 against rotation with the zoom sleeve 107 but guides the zooming lens unit to move reciprocably adjustably, that is axially in the rotatable zoom sleeve, as controlled by a cam slot 116 in the zoom sleeve 107. At the same time, back focus compensating axial movements of the zoom sleeve 107 are effected by a roller stud pin 117 carried by the fixed sleeve 113 and riding in a cam slot 118 provided for this purpose in the zoom sleeve.

In this instance, a fixed or stationary rear lens 119 is mounted in a disk 120 secured fixedly to the rear end of the fixed sleeve 113 in such a manner as to provide a closure for the cylindrical dashpot cell space within the fixed sleeve 113 and the zooming sleeve rearwardly of the zooming lens unit 108. Mounted on the rear face of the supporting disk 120 is a rotatable sealing shell ring 121 coupled through a splining pin 122 corotatively with the zooming sleeve 107 and providing a capstan to which is attached a flexible cable C by which the viewfinder (not shown) of the camera is coupled for zooming in synchronism with the zoom lens.

As shown in FIGURE 12, the zooming lens unit 108 is in its extreme wide angle position. During actuation of the zooming lens unit 108 rearwardly toward the telephoto position, air trapped within the dashpot pocket or cell behind the zooming lens resists rearward travel of the zooming lens for levelling its rate of travel and ironing out any tendency toward fluctuation in its rate of travel that may be imparted by manual power transmitted through the zooming mechanism by depressing the telephoto zooming button 35'. Reasonably accurate control of resistance to lens movement is attained by metering the air through a passage 123 in the fixed sleeve 113 and the base ring 114 under the control of a needle valve 124 accessible for adjustment peripherally on the stationary base ring member 114. During rearward movement of the zooming lens unit 108 exhausting displacement of air from the dashpot cell space is controlled by the needle valve 124, and on forward movement of the zooming lens unit 108 toward wide angle zoom adjustment return of air into the dashpot cell space is controlled by the needle valve. As a result, smooth, controlled, substantially level zooming movement is attained.

Figure 14:
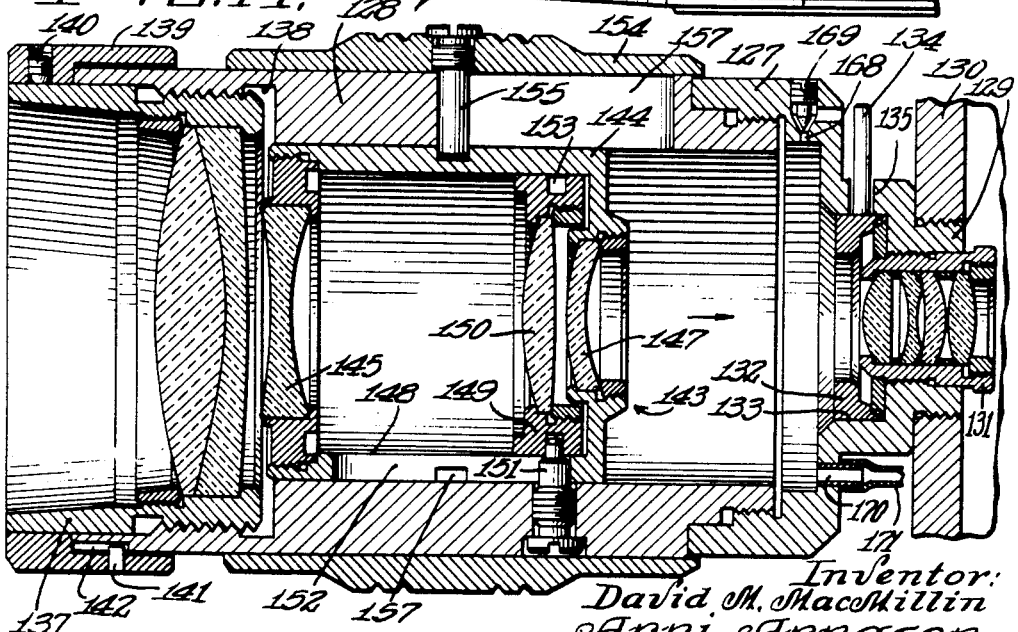
FIGURE 14 is an enlarged longitudinal vertical sectional detail view through the zoom lens of FIGURE 13.

Another arrangement embodying a zoom rate regulating dashpot device in the zoom lens assembly is represented in FIGURES 13 and 14 wherein the camera 11 has the zoom lens 125.

In this embodiment, the zoom lens assembly 125 is of rectilinearly adjustable construction comprising an elongated stationary barrel which may, if preferred, be constructed as a one-piece unit but for manufacturing convenience is shown as including a stepped generally ring-shaped base sleeve flange member 127 and a tubular body extension 128 of cylindrical bore and suitably machined complementary to the base flange for fixed threaded interconnection. On its rear end portion, the base flange member 127 is provided with a reduced diameter tubular boss portion 129 threadedly secured in a plate or front wall portion 130 of the camera 11 and mounting threadedly therein a rear objective cell 131. For acute adjustments of the rear objective the cell carries fixedly on its forward end an adjustment and sealing sleeve 132 closely slidably engaged within a cylindrical counterbore 133 in the base flange member 127 and provided with a radial rigid adjustment pin lever arm 134 projecting through a radially opening and circumferentially elongated clearance slot 135 in the wall of the intermediate stepped portion of the base flange member and with its outer end short of the maximum outside diameter of the base flange. By manipulation of the adjustment arm 134 rotation of the rear objective cell 131 can be effected through a limited range whereby it is threadedly adjustable through a limited axial range.

Mounted in suitably forwardly spaced coaxial relation to the rear objective is a focusing lens assembly mounted in a cell sleeve 137 adjustably threadedly secured within a counterbore 138 in the forward end portion of the barrel sleeve 128. Adjusted positions of the focusing lens are maintained by a retaining sleeve 139 releasably secured as by means of one or more set screws 140 to the forward end portion of the cell 137 and encompassing the forward end portion of the barrel sleeve 128 with which it is held longitudinally adjustably but non-rotationally as by means of a keying pin projection 141 projecting inwardly from the retainer sleeve into a longitudinal keying groove 142. Through this arrangement, after the focusing lens cell 137 has been properly adjusted relative to the barrel member 128, with the retainer sleeve 139 loosened, the set screws 140 are tightened and the focusing lens assembly is held in the adjusted position.

Mounted within the cylindrical bore of the barrel sleeve 128 is a rectilinearly adjustable zooming lens unit 143. This comprises a generally forwardly opening cylindrical generally cup-shaped cell 144 carrying a lens 145 of largest diameter in its front end portion while a lens 147 of smallest diameter is fixedly mounted in the rear end of the cell. Within the cell 144 is provided an elongated cylindrical bore 148 within which is slidably mounted a lens ring 149 carrying an intermediate stationary lens 150. A coupling between the barrel member 128 and the lens ring 150 is suitably effected as by means of a screw pin 151 projecting radially inwardly from the barrel sleeve through a longitudinal clearance slot 152 in the cell member 144 and having its tip engaged in a circumferential outwardly opening groove 153 in the lens ring 149. This enables the zooming cell 144 to be longitudinally reciprocably adjusted for zooming while the intermediate lens 150 is held stationary with the stationary zoom lens barrel.

Rectilinear zooming adjustments of the zooming lens unit cell 144 are effected by means of a rectilinearly adjustably movable zooming sleeve 154 slidably engaged about the zoom lens barrel member 128 and coupled to the zooming lens cell by means of a screw pin 155 projecting inwardly through a longitudinal clearance slot 157 in the tubular barrel member 128 into engagement within a circumferential outwardly opening groove 157 provided for this purpose in the perimeter of the cell member 144. Thus, by longitudinally reciprocably shifting the zooming sleeve 154, corresponding zooming movement of the cell 144 is effected. In FIGURES 13 and 14, the adjustment of the zooming lens unit 143 is depicted as in the extreme wide angle position while in the dot dash position of the zooming sleeve 154 the limit of telephoto adjustment is represented.

Zooming adjustment reciprocating movements of the zooming sleeve 154 are effected by means herein comprising a rearwardly projecting horizontal rack bar 158 fixedly secured to the rear end portion of the zooming sleeve 154 and extending through and guided by the edge defining a forward wall opening 159 in the enclosure housing 20'. Mounted rotatably within the housing 20' is a transmission 160 meshing with complementary rack teeth on one edge of the horizontal bar 158, and also in mesh with rack teeth 161 on the forward edge of a vertically mounted manual power transmission bar 162 guided for reciprocation within the housing 20' similarly as the corresponding rack bars 22 and 105 and pivotally attached at its upper end to the rock lever 26.

Zooming adjustment power is manually applied to the rock lever 26 through a wide angle vertically reciprocably mounted finger button 163 acting on its lower end against a compression thrust spring 164 seated on the thrust flange 33 on the rock lever forwardly of its pivot 32. Telephoto zooming adjustment is accomplished through a vertically reciprocable finger button 165 acting through a compression thrust spring at its lower end against the thrust flange 33' on the rock lever 26 rearwardly from its pivot 32. In FIGURE 13, the relationship is shown wherein digital power pressure has been applied to the telephoto adjustment button 165 so that its transmission thrust spring 167 is compressed, while the other thrust spring 164 has been permitted to relax and expand to enable shifting of the power transmission mechanism from the extreme wide angle adjustment shown in full lines to the limit of telephoto adjustment as shown in dot dash outline, or any desired adjustment between such extremes of adjustment.

Zoom rate regulating means in FIGURES 13 and 14 comprises a novel resistance dashpot device utilizing the zoom lens cell of the unit 143 as a dashpot piston to similar effect as in FIGURE 12 and with the additional feature of enabling selective substantially unresisted fast zooming adjustments or speed regulated adjustments at will and at any point throughout the full range of zooming adjustments. For this purpose, that portion of the cylindrical bore within the zoom lens barrel rearwardly from the zooming lens cell 144 serves as a dashpot cylinder and the zooming lens cell acts as a dashpot piston which is coupled to the manual power transmission by which the zooming lens is adjustably actuated. Air within the dashpot cylinder area is controlled to afford the desired zoom rate regulating resistance through a metering orifice 168 in the barrel base flange member 127 under the control of an adjustable needle valve 169. During telephoto zooming adjustment air from within the dashpot cylinder is adapted to be exhausted through the metering orifice 168. During wide angle adjustment zooming movements of the zooming lens cell 144 air is adapted to be drawn in through the metering orifice 168 to replenish the dashpot cylinder.

In addition, means are provided for venting the dashpot cylinder chamber for relatively free exhaust and replenishing movement of air, under the control of the camera user when fast zooming adjustments are desired. Accordingly, a relatively large vent opening 170 is provided to open from the dashpot cylinder area through the barrel closure flange member 127. Communicating with the vent opening is a combination air exhaust and inlet duct 171 which leads from the rear end of the zoom lens assembly through the housing 20' and into the camera housing. Respective branches of the duct 171 function in parallel relationship and are secured in communication, respectively, with a longitudinal air duct 172 opening through the lower end of the finger button 163 and a longitudinal air duct 173 opening through the lower end of the finger button 165. At their upper ends the air ducts 172 and 173 open through their respective finger buttons and are adapted to be closed by the respective fingers F by which the zooming adjustment finger buttons are adapted to be actuated. Through this arrangement, when both of the air ducts 172 and 173 are closed, air is forced through the resistance metering orifice 168 to afford zoom speed levelling control. When either of the fingers F is released from the head of the finger button adapted to be actuated thereby or at least is so applied to the button as to uncover the head exit opening of the associated air duct, substantially free movement of air out of and into the dashpot cylinder area through the conduit 171 and the vent opening 170 is permitted for fast zooming adjustment for any desired interval of zooming actuation, with levelling control resumed virtually instantaneously by again closing the release openings at the head ends of the zooming button air ducts 172 and 173. It will be appreciated that this affords substantial versatility in the zooming system.

In all forms of the invention control of the zooming rate is effectively accomplished to attain smooth, level zooming speed during manual powering of the zooming mechanism.

It will be understood that modifications and variations may be effected without departing from the scope of the novel concepts of the present invention.

We claim as our invention:

1. A camera including a zooming lens, a pair of manual power finger buttons one of which is adapted to apply power for wide angle zooming adjustment and the other of which is adapted for telephoto zooming adjustment, a rock lever pivotally mounted and coupled for respectively opposite pivotal movements by said finger buttons, a rack bar attached to said rock lever for reciprocation thereby and serving as a manual power transmission element, means coupling said rack bar to the zoom lens for effecting zooming adjustments, and means associated with said rack bar for resisting application of power to said buttons whereby to assure level zooming speed.

2. A camera as defined in claim 1, wherein said resisting means comprises a dashpot structure operatively coupled directly with said rack bar.

3. A camera as defined in claim 1, wherein said resisting means comprises a dashpot device in the zoom lens.

4. A camera as defined in claim 1, wherein said resisting means comprises a brake device frictionally engaging the rack bar.

5. A camera as defined in claim 1, wherein said resisting means is adjustable for varying the zooming speed.

6. A camera as defined in claim 1, wherein said resisting means includes a resistance fluid.

7. A camera as defined in claim 1, wherein said resisting means includes an air displacement device.

8. A camera as defined in claim 1, wherein said resisting means includes a dashpot structure for coupling said rack bar to the zoom lens.

9. A camera as defined in claim 1, wherein said resisting means includes a rotary vane means.

10. A camera as defined in claim 1 wherein said resisting means includes a zooming lens cell and a cylindrical structure housing the cell and providing a dashpot cylinder in which the cell is reciprocable and serves as a dashpot piston, and means for controlling displacement and replenishment flow of air with respect to said dashpot cylinder.

11. A camera as defined in claim 1 wherein said resisting means includes; a zooming lens cell and a cylindrical structure housing the cell and providing a dashpot cylinder in which the cell is reciprocable and serves as a dashpot piston, means for controlling displacement and replenishment flow of air with respect to said dashpot cylinder, and means for selectively venting said cylinder for high speed zooming.

12. A camera including a zoom lens, manually powered means for zooming said lens, and means including a resistance device operatively coupled to the manually powered means for effecting level zooming speed between wide angle and telephoto zoom adjustment limits, said resistance device including means for returning the zoom lens to normal position intermediate said limits when the manual power is released from said manually powered means.

13. A camera as defined in claim 11, wherein said manually powered means comprises finger buttons having air ducts therethrough and said venting means includes a conduit communicating with said air ducts.

14. A camera including a zoom lens, manually operable wide angle and telephoto zooming adjustment buttons, a rock lever mounted in association with said buttons to be rocked thereby in opposite directions, a reciprocable rack bar pivotally attached to said rock lever, power transmission means for coupling said rock lever operatively with the zoom lens including a pinion means rotatable by the rack bar, and a zooming sleeve forming part of the zoom lens and having an actuating rack bar extending therefrom and meshing with the pinion means for reciprocable movements in the direction of rotation of the pinion means by said lever-attached rack bar.

15. A camera including a zoom lens, manually operable wide angle and telephoto zooming adjustment buttons, a rock lever mounted in association with said buttons to be rocked thereby in opposite directions, power transmission means coupling said rock lever operatively with the zoom lens, compression thrust springs interposed between said buttons and said rock lever, said springs being adapted to transmit energy received from said zooming buttons to said power transmission means, a speed leveling resistance device in said power transmission coupling means, said resistance device including means to limit the maximum rate of movement of the zoom lens, said springs being adapted to store energy transmitted thereto by one of said zooming buttons in excess of that required to move the zoom lens at its maximum rate, said excess energy being transmitted to said power transmission coupling means during the period following the actuation of said one button, whereby a substantially even zooming action will be obtained.

References Cited by the Examiner
UNITED STATES PATENTS

| | | | |
|---|---|---|---|
| 729,014 | 5/1903 | Thornton | 95—54 X |
| 2,134,757 | 11/1938 | Goldsmith | 95—45 X |
| 2,507,182 | 5/1950 | Young | 95—63 |
| 2,924,146 | 2/1960 | Back | 95—45 X |
| 2,995,061 | 8/1961 | Briskin | 95—45 |
| 3,002,422 | 10/1961 | Lohmeyer | 95—45 X |
| 3,091,164 | 5/1963 | Brandt | 95—54 |
| 3,165,044 | 1/1965 | Himmelsbach | 95—45 |

JOHN M. HORAN, *Primary Examiner.*